Feb. 27, 1968    C. S. DAGGY    3,371,344
MICROWAVE COUPLER
Filed April 28, 1967
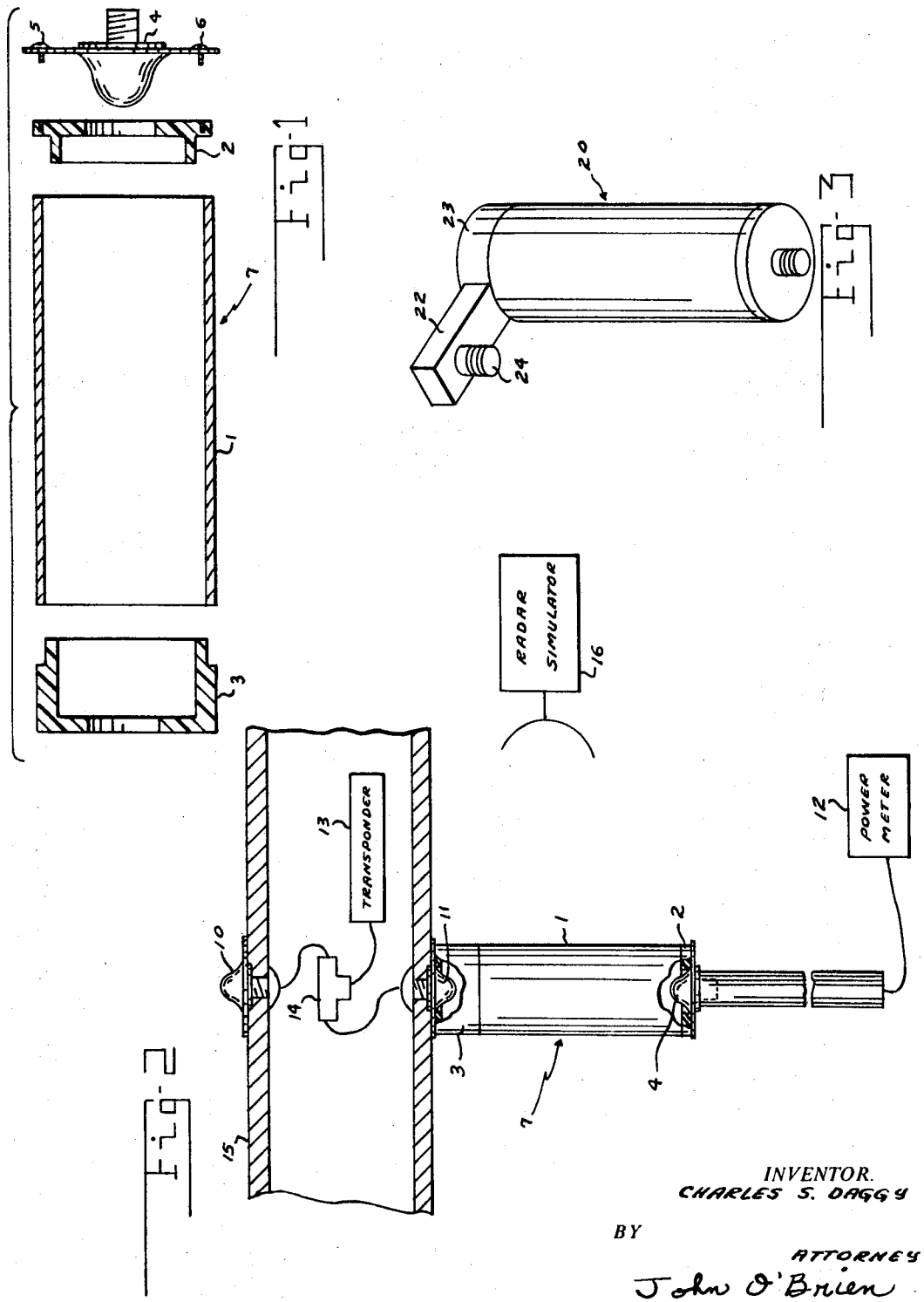
INVENTOR.
CHARLES S. DAGGY
BY
ATTORNEY
John O'Brien
AGENT 3,371,344
MICROWAVE COUPLER
Charles S. Daggy, North Edwards, Calif.
(P.O. Box 373, Edwards, Calif. 93523)
Filed Apr. 28, 1967, Ser. No. 635,959
4 Claims. (Cl. 343—17.7)

ABSTRACT OF THE DISCLOSURE

For use in testing the operating characteristics of a transponder unit located within an aircraft, a microwave coupler that transmits the transponder signal from the aircraft antenna to the testing apparatus and transmits an interrogating signal coming from outside the aircraft to the aircraft antenna. The coupler consists of a circular waveguide section that is terminated at each end with a dielectric cylindrical insert. It is the dielectric inserts that permit reception of an interrogating signal from free space.

Background of the invention

This invention relates to a microwave coupler that is specially designed to assist in the checkout of a radar transponder's operation. The purpose of this invention is to guide the full output power from the transponder's antenna into a measuring device.

Because a radar transponder is located within an aircraft, it is difficult to directly measure its operating characteristics during a routine or preflight checkout. Although the transponder is not readily accessible for testing purposes, its output signal is transmitted by the transponder's antenna. Thus, it appears the transponder's operating characteristics could be measured by using a wave guide fitted over the antenna to couple the full output power from the transponder's antenna to an appropriate measuring device. The problem encountered in employing this simple technique is that such a waveguide would shield the transponder's antenna from receiving the interrogating signal necessary to trigger the transponder's operation.

Transponder testing system prior to this invention overcame this problem by using an access plate to gain access to the aircraft's interior adjacent to the antenna. To test the transponder, the user would remove the access plate and reach through the opening to disconnect the connector input to the antenna from the transponder. The connector could then be pulled out the opening and connected directly to the measuring device. There are many objections to using this testing method. It is time consuming and causes undue wear on connectors. In some aircraft, the coaxial connector to the antenna is not accessible without the removal of other equipment. Also, the slightest damage to the coaxial connector when reassembling it to the antenna could cause marginal operation or failure of the unit.

The microwave coupler of this invention enables the testing of a transponders operation without requiring access to the aircraft's interior. It transmits the full power output from the antenna to a measuring device without excluding the interrogating signal.

Summary of the invention

The microwave coupler of the present invention consists of a standard circular wave guide structure whose ends are terminated in dielectric cylindrical inserts. One or both of these inserts are of sufficient length for the reception of the interrogating signal. It is this feature which permits the coupler to be placed over the antenna without excluding the reception of the interrogating signal into the antenna.

The manner of using the coupler is simple and easy. The coupler is held or supported against the aircraft, not attached to it. Positioning of the coupler is not critical for it works in any angular position about its longitudinal axis.

The object of this invention is to provide a coupling device for transmitting from a transponder antenna the transponder signal to a measuring device and for receiving an interrogating signal from free space into the transponder's antenna.

Brief description of the drawings

FIGURE 1 depicts one embodiment of the present invention.

FIGURE 2 illustrates the method of using the present invention.

FIGURE 3 depicts a second embodiment of the present invention.

Description of the preferred embodiment

FIGURE 1 shows a cross-sectional view of an embodiment of the present invention comprising metallic cylinder 1, cylindrical dielectric inserts 2 and 3 and connector 4. Connector 4 is preferably a conventional N-type, which is attached to insert 3 by means of screws 5 and 6. Dielectric inserts 2 and 3 are press fitted into cylinder 1.

Microwave coupler 7 uses the wave propagation theory of a single terminal device (in this case a circular wave guide) in which the frequency of the wave and dimensions of the guide determine its mode of propagation. The dimensions are selected so that the transverse magnetic field is utilized for optimum transfer of energy at each end of coupler 7 without a change in polarization when the source and load terminals are rotated upon coupler's 7 longitudinal axis. The source and load terminals have their center line on this axis.

The ends of coupler 7 are terminated with dielectric inserts 2 and 3. Inserts made of Teflon and nylon have been found to be quite satisfactory. The length of insert 3 is selected to permit reception of the interrogating signal from space. The combined lengths of inserts 2 and 3 with cylinder 1 must be chosen to meet the above-described dimension requirements for proper wave propagation.

As an example of the proper dimensions for coupler 7, the dimensions determined for a transponder signal having a 5,650 mc. center frequency are as follows: length of insert $2=\%_{16}$ inch, length of insert $3=\%_{16}$ inch, length of cylinder $1=4$ inches, and inner diameter of cylinder $1=\%$ inch. The lengths of inserts 2 and 3 pertain to the portion extending beyond cylinder 1 when assembled.

The dominant dimension factor is the diameter of a circular wave guide such as coupler 7. This must be some figure greater than one-half wavelength or there will be no propagation through the wave guide.

Also, by selecting the proper ratios of diameter to length of coupler 7 (determined by the frequency), a broadband coupler will result whose attenuation may be designed into the coupler.

The method of using microwave coupler 7 is illustrated in FIGURE 2. Although not shown in FIGURE 2, similar testing apparatus to that shown with lower antenna 11 would be used with upper antenna 10.

Transponder 13 shown in block diagram form is a conventional transponder unit. Power divider 14 is employed in a well known arrangement to deliver maximum power output to each antenna, 10 and 11. Power divider 14 couples transponder 13 to upper antenna 10 and lower antenna 11 which project through openings in air frame 15.

To measure the output power, coupler 7 is held in the position shown in FIGURE 2. Radar simulator 16, which is located at least a few feet from the aircraft, emits an interrogating signal which passes through insert 3 into antenna 11 and is received by transponder 13. As is well known in the art, the interrogating signal triggers the operation of transponder 13 to produce a transponder signal. This transponder signal is transmitted from antenna 11 and passes through microwave coupler 7 into power meter 12 where the output peak power of transponder antenna 11 is indicated.

Microwave coupler 20 shown in FIGURE 3 is a modification of the coupler of FIGURE 1. Coupler 20 is identical to the coupler of FIGURE 1 with the exception that a one-half wavelength, rectangular waveguide section 22 with a shorted outer end is attached to insert 23, with its wide axis set at ninety degrees to coupler's 20 longitudinal axis. At the quarter wave point on the broad face of waveguide 22 is inserted a quarter wave probe with an N-type connector 24 for coaxial feed of an interrogating signal.

The method of testing using coupler 20 is the same as using coupler 7 of FIGURE 1 except the interrogating signal is transmitted from a radar simulator unit through a coaxial line into connector 24. Because the complete interrogating signal is received at the transponder, it is now possible to measure the receiver sensitivity of the transponder.

I claim:
1. A microwave coupler for the transmission of microwave energy from an antenna to a testing apparatus and for the transmission of a microwave signal from free space to said antenna, said coupler comprising:
    a metallic circular waveguide section having a diameter greater than one-half the wavelength of said microwave energy,
    a first dielectric cylindrical insert covering one end of said waveguide section and having a circular opening whose center is located in alignment with the center line axis of said waveguide section,
    a connector means being mounted on said first insert adjacent to said circular opening for transmitting said microwave energy passing through said circular opening to said testing apparatus, and
    a second dielectric cylindrical insert covering the other end of said waveguide section and having a circular opening whose center is located in alignment with the center axis of said waveguide section and whose diameter is of sufficient size to fit over said antenna, the length of said first insert being large enough to permit reception of said microwave signal from free space and transmission of said microwave signal to said antenna.

2. A microwave coupler, as defined in claim 1, wherein said first and second dielectric inserts are made of Teflon.

3. A microwave coupler for the transmission of microwave energy from an antenna to a testing apparatus and for the transmission of a microwave signal from a radar simulator unit to said antenna, said coupler comprising:
    a metallic circular waveguide section having a diameter greater than one-half the wavelength of said microwave energy,
    a first dielectric cylindrical insert covering one end of said waveguide section and having a circular opening whose center is located in alignment with the center line axis of said waveguide section,
    a second dielectric cylindrical insert covering the other end of said waveguide section and having a circular opening whose center is located in alignment with the center axis of said waveguide section and whose diameter is of sufficient size to fit over said antenna, the length of said first insert being large enough to permit reception of said microwave signal from said radar simulator and transmission of said microwave signal to said antenna, and
    means for directly transmitting said microwave signal from said radar simulator to said second dielectric insert.

4. A microwave coupler, as defined in claim 3, wherein said means for directly transmitting said microwave signal includes:
    a one-half wavelength, rectangular waveguide section having one end shorted and the other end attached to said second dielectric insert in such a manner that its wide axis is perpendicular to the longitudinal axis of said second dielectric insert, said microwave signal being introduced into said rectangular waveguide section through a quarter-wave probe located at the quarter-wave point from said shorted end.

No references cited.

RODNEY D. BENNETT, *Primary Examiner.*

J. P. MORRIS, *Assistant Examiner.*